Figure 1:
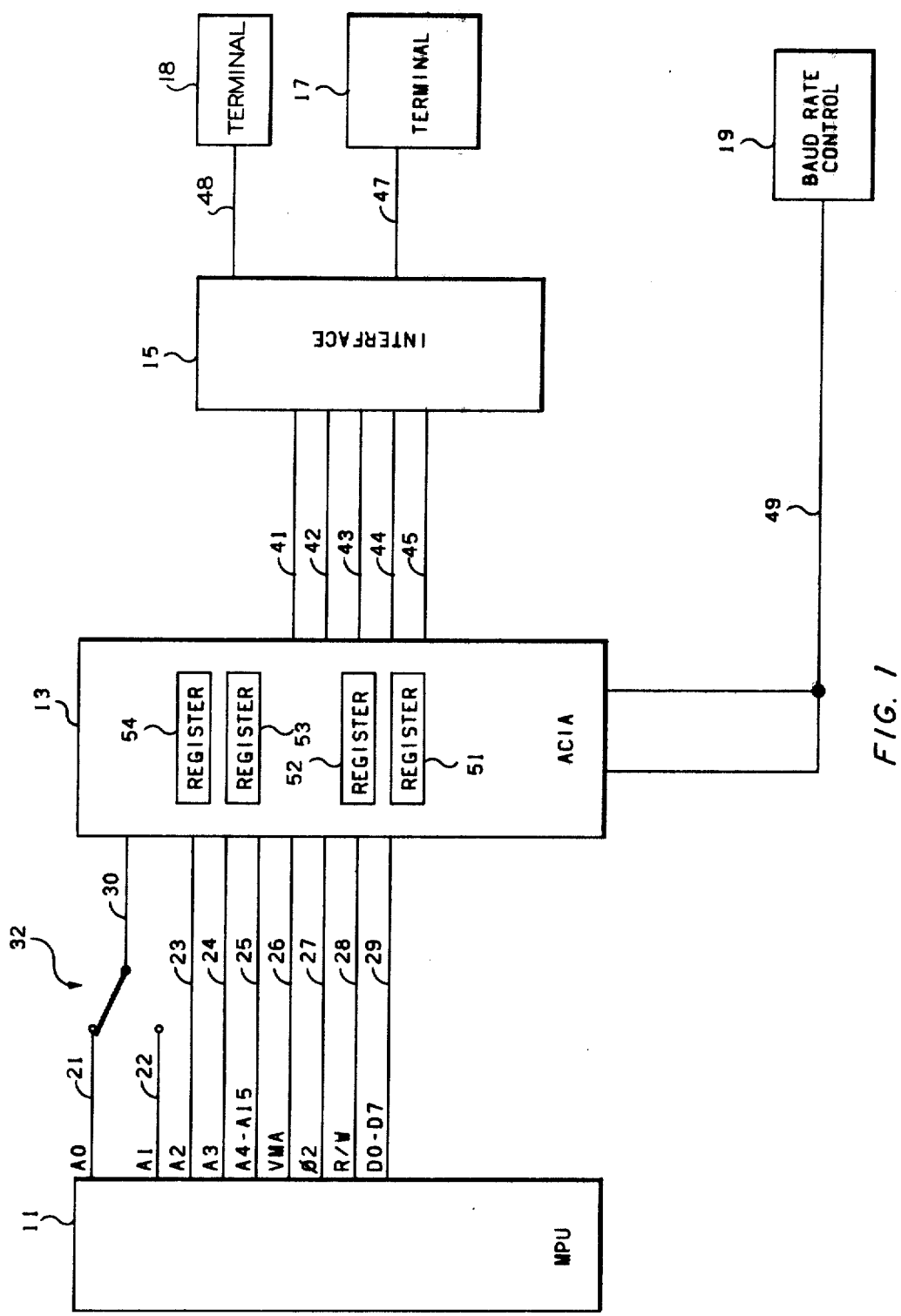

United States Patent [19]

DeShon

[11] 4,188,664
[45] Feb. 12, 1980

[54] I/O TERMINAL IDENTIFICATION

[75] Inventor: Wallace E. DeShon, Bartlesville, Okla.

[73] Assignee: Phillips Petroleum Company, Bartlesville, Okla.

[21] Appl. No.: 851,650

[22] Filed: Nov. 15, 1977

[51] Int. Cl.² ............................................. G06F 3/02
[52] U.S. Cl. ..................................................... 364/200
[58] Field of Search ... 364/200 MS File, 900 MS File; 340/167 R, 152 R

[56] References Cited

U.S. PATENT DOCUMENTS

| | | | |
|---|---|---|---|
| 3,668,651 | 6/1972 | Hornung | 364/200 |
| 3,699,525 | 10/1972 | Klavins | 364/200 |
| 3,742,455 | 6/1973 | Fenner | 340/167 R |
| 3,833,886 | 9/1974 | Baymann | 340/167 R |
| 4,016,369 | 4/1977 | Pedersen | 364/900 |
| 4,079,452 | 3/1978 | Larson | 364/900 |

Primary Examiner—James D. Thomas

[57] ABSTRACT

Control of the data format programmed into an interface means by a computer means is provided in response to the data format required by an I/O device. A register in the interface means is programmed to respond to only a first digital address from the computer means. A switching means having first and second positions is utilized to create "don't care" positions in a digital address from the computer means to the interface means. Because of the "don't care" positions in the digital address the register in the interface means will respond to a second digital address when the switching means is in the first position. The register will not respond to the second digital address when the switching means is in the second position. When the register responds to the second digital address then the computer programs the data format required by a first I/O means into the interface means. When the register does not respond to the second digital address then the computer programs the data format required by a second I/O means into the interface means. Thus, the position of the switching means determines the data format which will be programmed into the interface means.

9 Claims, 1 Drawing Figure

I/O TERMINAL IDENTIFICATION

This invention relates to a method and apparatus for controlling an interface means between a computer means an input/output (I/O) device. In a particular aspect this invention relates to a method and apparatus for providing information to a computer means concerning the data format which must be programmed into the interface means to allow data transmission between the computer means and the I/O device where different I/O devices which demand different data formatting schemes may be utilized interchangeably.

In present day computer technology it is often desirable to provide data from a computer means to a variety of I/O devices such as teletype machines (TTY), cathode ray tubes (CRT) or thermal printers. It is also desirable to input data to the computer means from the I/O devices. In both cases the data must be formatted so that it may be utilized by either the computer means or the I/O devices. Special circuits termed interface means have been developed in many cases to perform the required data formatting function.

The computer must know what type of I/O device is in the system to know what data format to program into the interface means. If only one type of I/O device is utilized there is no problem. The problem occurs when different types of I/O devices may be used interchangeably in the same system because the computer means often has no way of knowing what type of I/O device is in the system at any one time. An example of this is when a TTY and a CRT terminal may be utilized interchangeably. A TTY requires 11 bits of serial data at 110 baud. Most other serial I/O devices such as a CRT requires 10 bits of serial data at rates above 300 baud. Different data formats are thus required for a TTY and a CRT or for any other types of I/O devices which use different data rates or different serial bit lengths.

This problem is especially evident in the field of microprocessors. The entire computer system is often an chips and there is simply no way to provide an outside address to the microprocessor to tell it what kind of I/O device is in the system at any one time. This would prevent the use of microprocessors in applications where different types of I/O devices requiring different data formats may be used interchangeably in the same system unless a method is provided whereby the microprocessor can known what type of I/O device is in the system at any one time.

Accordingly it is an object of this invention to provide a method and apparatus for controlling an interface means between a computer means and an I/O device. It is a particular object of this invention to provide a method and apparatus for providing information to a computer means concerning the data format which must be programmed into the interface means to allow data transmission between the computer means and the I/O devices which demand different data formatting schemes may be utilized interchangeably.

In accordance with the present invention a method and apparatus is provided whereby image locations created by "don't cares" are utilized to provide the computer means with information as to what type of I/O device is in the system. This is done by using binary images. An example of this is where there is a register in an interface means which has been programmed to send data to the computer means when the address from the computer means to the interface means is equal to 0100. If a switching means is utilized so that the second least significant bit is in a "don't care" position then the address 0100 will be identical to the address 0110 when it is received by the interface means. The register will thus respond to an address of 0110 even though it is programmed to respond only to an address of 0100. The computer programs the interface means with one data format corresponding to one type of I/O device if the register responds to an address of 0110 and with another data format corresponding to a second type of I/O device if the register does not respond to an address of 0110. The switching means position may be set by an operator or may be set automatically to correspond to a certain type of I/O device and in this manner the computer means is provided with information as to the type of I/O device in the system.

Other objects and advantages of the invention will be apparent from the description of the invention and the appended claims thereto as well as from the detailed description of the drawing which is a block diagram of the required interfacing for a typical microprocessor to I/O terminal link.

For the sake of convenience and ease of illustration the invention will be described in terms of a preferred embodiment utilizing the Motorola 6800 microprocessor family. Although the invention is described in terms of a specific computer system, the invention is also applicable to other computer systems where information must be provided to a computer as to what type of I/O device is in the system at any particular time.

A specific address and programming scheme is set forth in the description of the preferred embodiment of the invention as an example only. As is well known in the art many different programming schemes could be utilized depending on the computer system involved. The invention is applicable to any programming scheme which is part of a method and apparatus such as those described in the peferred embodiment of this invention and which performs the functions of the programming scheme set forth as an example in the preferred embodiment of the invention.

Referring now to the drawing the microprocessor (MPU) 11 is, in this preferred embodiment, a Motorola 6800 microprocessor. The Asynchronous Communication Interface Adapter (ACIA) 13 is a Motorola. 6850. Both the Motorola 6800 and 6850 are well known systems. Operational and functional characteristics are set forth in detail in *Microprocessors And Microcomputers* by Branko Soucek, published by John Wiley and Sons, 1976, at pages 299-340 and in *Microcomputer-Based Design* by John B. Peatman, published by McGraw-Hill Inc., 1977, at pages 481-494.

The interface means 15 converts the 0-5 volt transistor-transistor logic (TTL) levels from the ACIA to the current or voltage levels required by the I/O terminals. In this preferred embodiment the I/O terminal is a teletype terminal 17 or a terminal 18 which is compatible with EIA RS232. The interface converts the TTL levels from the ACIA to a 20 ma loop for the teletype terminal 17 or to ±12 volts for a terminal 18 which requires an RS232 input.

The baud rate control means 19 controls the baud rate of the data flow from the MPU 11 to the I/O terminals 17 and 18 and from the I/O terminals 17 and 18 to the MPU 11.

Both the baud rate control 19 and the interface mans 15 are well known in communications art. A Programmable Bit Rate Generator, 34702, manufactured by Fairchild Semiconductor may be used as a baud rate control means. One method of implementing the 34702 as a baud rate control means is shown on page 292 of *Microcomputer-Based Design* by John B. Peatman, McGraw-Hill, 1977. The 9616, Triple EIA RS-232-C/Mil-Std-188C Line Driver and the 9617, Triple EIA RS-232-C Line Receiver manufactured by Fairchild Semiconductor may be used as a TTL to RS-232 and RS-232 to TTL interface. The 4371 Optical Isolator manufactured by Hewlett Packard may be used in conjunction with a current limiter as an interface for a TTY terminal requiring a 20 ma loop.

The MPU 11 is connected to the ACIA 13 through the two-way signal lines 21-29. Signal lines 21-25 are representative of the sixteen signal lines available for addressing. Signal line 26 carries the valid memory address (VMA) signal. Signal 27 is an enabling signal. Signal 28 is a read/write signal. Signal 29 is representative of the eight signal lines available for data. The terminology is consistent with the reference cited above. These references give a further description of the generation and function of these signals.

Signal 21 is supplied to the ACIA 13 as signal 30 when the switching means 32 is in the position shown in FIG. 1 which will be referred to as the first or A0 position. Signal 22 is supplied to the ACIA 13 as signal 30 when the switching means is in the second or alternative position from that shown in FIG. 1. This second or alternative position will be referred to as the A1 position. The switching means 32 is, in a preferred embodiment, a 53137-1 manufactured by AMP, Inc.

The interface means 15 is connected to the ACIA 13 through signal lines 41-45. These signal lines carry asynchronous serial data and control signals. The interface means 15 is also connected to the I/O terminal 17 through signal line 47 and to I/O terminal 18 through signal line 48. Signal line 47 carries asynchronous serial data from the interface means 15 to the I/O terminal 17 and from the I/O terminal 17 to the interface means 15. Signal line 48 carries asynchronous serial data from the interface means 15 to the I/O terminal 18 and from the I/O terminal 18 to the interface means 15.

The baud rate control 19 is connected to the ACIA 13 through signal line 49.

The ACIA 13 contains four registers. These are a status register 51, a control register 52, a transmit data register 53, and a receive data register 54. These registers may be programmed in such a manner that a specific digital address from the MPU 11 will enable a pair of the registers of the registers to perform their function.

As has been stated in the preceding paragraphs, many times it is desirable to use the MPU 11 and the ACIA 13 in a system in which the I/O terminals 17 and 18 may be used interchangeably. An example of this is where a TTY terminal 17 and a CRT terminal 18 are used interchangeably in a system. The TTY terminal 17 requires eleven bits of serial data at 110 baud. The CRT terminal 18 requires ten bits of serial data at rates above 300 baud. The ACIA 13 must provide the data from the MPU 11 to the I/O terminals 17 and 18 and from the I/O terminals 17 and 18 to the MPU 11 at the required data rate and required data format.

The baud rate control 19 may be readily used to vary the baud rate. This may be done manually or automatically as may be desired. The problem occurs with the data format. The data format must be programmed into the ACIA 13 by the MPU 11. In order to do this the MPU 11 must know what type of I/O terminals 17 and 18 is in the system. This information is provided to the MPU by utilizing switching means 32 to create a "don't care" position in a binary address from the MPU 11 to the ACIA 13.

An example of this technique is as follows. Assume that a TTY terminal 17 and a CRT terminal 18 may be used interchangeably. Switching means 32 is placed in the A0 position when the TTY terminal 17 is in the system and is placed in the A1 position when the CRT terminal 18 is in the system. In this example, the ACIA registers are programmed in such a manner that a hexadecimal address 8004 enables the status regiser 51 and the control register 52, and 8007 enables the receive data register 54 and the transmit data register 53. The hexadecimal address is provided from the MPU 11 to the ACIA 13 through signal lines 21-25 which carry the address bits A0-A15.

Table I shows the four least significant bits A0-A3 of the address in binary form.

TABLE I

| A3 | A2 | A1 | A0 | Address |
|----|----|----|----|---------|
| 0  | 1  | 0  | 0  | 8004    |
| 0  | 1  | 0  | 1  | 8005    |
| 0  | 1  | 1  | 0  | 8006    |
| 0  | 1  | 1  | 1  | 8007    |

If the switching means 32 is in the A0 position then the ACIA receives only data bits A0, A2, A3, and A4-A15. Data bit A1 is not received: thus the A1 column of Table I is a "don't care" column. An examination of Table I shows that when data bit A1 is a "don't care" then the address 8004 is identical to 8006 and the address 8005 is identical to 8007.

When the MPU 11 addresses the ACIA 13 with a binary address 8006 the ACIA 13 will receive an address identical to the address that would have been received if the MPU 11 had addressed the ACIA 13 with a binary address 8004. The status register 51 will send data to the computer means in response to the 8006 address even though it is programmed to answer only to an 8004 address. The MPU 11 is programmed in such a manner, that when the status register 51 responds to an address of 8006, the MPU will know that a TTY terminal 17 is in the system and will program the ACIA accordingly.

Table II shows a routine which may be used to perform the function described in the preceding paragraphs. A complete functional listing of the Motorola 6800 microprocessor instruction set, from which the routine shown in Table II was developed, is given in Table 8.2 at page 312 of *Microprocessors and Microcomputers* by Branko Soucek.

TABLE II

| | ACIA INITIALIZATION ROUTINE | | |
|---|---|---|---|
| Address in Memory | Machine Language | Assembler Language | |
| n + 0 | CE8004 | LDX #$8004 | Set Index Register on ACIA |
| n + 3 | 8603 | LDA A #$03 | Master Reset ACIA |
| n + 5 | A700 | STA A O,X | |
| n + 7 | 44 | LSR A | Program ACIA With 01,TTY Control Word |
| n + 8 | A700 | STA A O,X | |
| n + A | A600 | LDA A O,X | Check for Data at 8004 to equal 8006 |
| n + C | A102 | CMPA 2,X | |
| n + E | 2704 | BEQ EXIT | If equal exit |

TABLE II-continued

| ACIA INITIALIZATION ROUTINE | | | |
|---|---|---|---|
| Address in Memory | Machine Language | Assembler Language | |
| m + 10 | 8609 | LDA A #$09 | Else Program ACIA with 09,RS232 Control Word |
| n + 12 | A700 | STA A O,X | |
| n + 14 | | EXIT | |

The purpose of the routine shown in Table II would be apparent to one skilled in the art of programming microprocessors. Essentially the MPU 11 initially programs the ACIA 13 for the 11 bit format required by TTY terminal 17. The MPU 17 then addresses the status and control registers 51, 52 of the ACIA 13 with an address of 8004. The status register 51 will transmit the data it holds to the MPU in response to this address. In this preferred embodiment the data held by the status register 51 will be 02. The MPU stores the data from the status register 51 and addresses the ACIA 13 with an address of 8006. If the switching means 32 is in the A0 position, then the status register will again respond. The MPU compares the data received from the two addresses 8004 and 8006. If the data is equal, then the MPU leaves the ACIA programmed for the 11 bit format required for a TTY terminal 17. If the data is not equal, then the MPU 11 will known that the switching means 32 is in the A1 position corresponding to a CRT terminal 18 and the MPU 11 will reprogram the ACIA 13 for 10 bit format.

The invention has been described in terms of the presently preferred embodiment. Reasonable various and modifications are possible, by those skilled in the art, within the scope of described invention and the appended claims. Such various as utilizing addressing schemes and using different computer systems, interfaces, and I/O terminals are within the scope of the invention.

That which is claimed is:

1. Apparatus comprising:
a computer means;
a first input/output (I/O) terminal means which requires a first data format;
a first interface means which interfaces said computer means to said first I/O terminal means;
a register means which is an integral part of said first interface means;
a switch having first and second positions;
means for supplying digital addresses from said computer means to said register means, at least a portion of said digital addresses being supplied from said computer means through said switch to said register means, the presence of said switch preventing at least one digit of the digital addresses supplied by said computer means from reaching said register means, so that a second digital address supplied by said computer means to said register means, as received by said register means, will be equivalent to a first digital address, as received by said register means, if said switch is in said first position and will not be equivalent to said first digital address, as received by said register means, if said switch is in said second position; and
means for supplying digital data from said register means to said computer means when said first digital address is received by said register means or when said second digital address, as received by said register means, is equivalent to said first digital address, said computer means having means for introducing said first data format into said first interface means when said register means is enabled to supply the digital data stored in said register means to said computer means by said second digital address.

2. Apparatus in accordance with claim 1 additionally comprising a second I/O terminal means which requires a second data format and which is interfaced to said computer means by said first interface means; said computer means having means for introducing said second data format into said first interface means when said switch is in said second position and said register means is not enabled to supply the digital data stored in said register means to said computer means by said second digital address.

3. Apparatus in accordance with claim 2 additionally comprising a baud rate control means for controlling the baud rate of said first interface means where said first I/O terminal means and said second I/O terminal means require different baud rates.

4. Appratus in accordance with claim 3 additionally comprising a second interface means for converting the transistor-transistor logic levels of said first interface means to the current or voltage levels required by said first and second I/O terminals.

5. Apparatus in accordance with claim 4 wherein said computer means comprises a microprocessor.

6. A method for providing the proper data format to an interface means which interfaces a computer means to a first I/O terminal means, said interface means having a register means that is enabled to supply the digital data stored in said register means to said computer means only when said register means is addressed by a first digital address from said computer means or when said register means is addressed from said computer means by a second digital address which, as received by said register means, is equivalent to said first digital address, comprising the steps of:
supplying digital addresses from said computer means to said register means, at least a portion of said digital address being supplied from said computer means through a switch, having first and second positions, to said register means, the presence of said switch preventing at least one digit of the digital addresses supplied by said computer means from reaching said register means, so that said second digital address supplied by said computer means to said register means, as received by said register means, will be equivalent to said first digital address, as received by said register means, if said switch is in said first position and will not be equivalent to said first digital address, as received by said register means, if said switch is in said second position; and
actuating said computer means to introduce the data format required by said first I/O terminal means into said interface means if said register means is enabled to supply the digital data stored in said register means to said computer means when said second digital address is received by said register means.

7. A method in accordance with claim 6 comprising the additional step of actuating said computer means to introduce the data format required by a second I/O terminal means into said first interface means if said register means is not enabled to supply the digital data stored in said register means to said computer means when said second digital address is received by said register means.

8. A method in accordance with claim 7 comprising the additional step of controlling the baud rate of said first interface means where said first I/O terminal means and said second I/O terminal means require different baud rates.

9. A method in accordance with claim 8 comprising the additional step of converting the transistor-transistor logic levels of said interface means to the current or voltage levels required by said first and second I/O terminal means.

* * * * *

UNITED STATES PATENT AND TRADEMARK OFFICE
CERTIFICATE OF CORRECTION

PATENT NO. : 4,188,664
DATED : February 12, 1980
INVENTOR(S) : Wallace E. DeShon It is certified that error appears in the above-identified patent and that said Letters Patent are hereby corrected as shown below:

Column 6, claim 4, line 1, "Appratus" should be --- Apparatus ---

Column 6, claim 6, line 14, after "digital", "address" should be --- addresses ---.

Signed and Sealed this

Thirtieth Day of September 1980

[SEAL]

Attest:

SIDNEY A. DIAMOND

*Attesting Officer*     *Commissioner of Patents and Trademarks*